United States Patent [19]

Wakabayashi

[11] Patent Number: 4,462,315
[45] Date of Patent: Jul. 31, 1984

[54] POWER-AND-FREE TROLLEY CONVEYOR
[75] Inventor: Takao Wakabayashi, Toyonaka, Japan
[73] Assignee: Nakanishi Metal Works Co., Ltd., Osaka, Japan
[21] Appl. No.: 322,188
[22] Filed: Nov. 17, 1981
[30] Foreign Application Priority Data Nov. 28, 1980 [JP] Japan .................. 55-172007[U]

[51] Int. Cl.³ ............... B61B 5/02; B61B 10/02; B61D 49/00
[52] U.S. Cl. ................. 104/172 S; 104/89; 104/133; 105/148; 134/45; 198/473
[58] Field of Search ........... 104/89, 94, 133, 172 R, 104/172 S, 173 R; 105/148, 242; 134/45, 76, 77, 123, 155; 198/473, 681

[56] References Cited

U.S. PATENT DOCUMENTS

| | | | |
|---|---|---|---|
| 2,634,851 | 4/1953 | Steinhoff | 104/89 X |
| 3,033,345 | 5/1962 | Prymek | 198/473 |
| 3,342,165 | 9/1967 | Szymanski | 104/89 X |
| 3,382,992 | 5/1968 | Couchman | 105/242 X |
| 3,426,700 | 2/1969 | Klamp | 104/94 |
| 3,690,268 | 9/1972 | Goldstein | 104/172 S |
| 3,820,466 | 6/1974 | Allen | 104/133 X |
| 3,926,125 | 12/1975 | Orwin | 104/172 S X |
| 4,073,236 | 2/1978 | Harrington | 198/473 |
| 4,144,817 | 3/1979 | Morita | 104/133 X |

FOREIGN PATENT DOCUMENTS

| | | | |
|---|---|---|---|
| 1331323 | 9/1973 | United Kingdom | 104/89 |
| 768709 | 11/1980 | U.S.S.R. | 104/89 |
| 814816 | 3/1981 | U.S.S.R. | 104/89 |

Primary Examiner—Howard Beltran
Attorney, Agent, or Firm—Armstrong, Nikaido, Marmelstein & Kubovcik

[57] ABSTRACT

A power-and-free trolley conveyor comprising a power line rail, a free line rail disposed immediately below the power line rail, another free line rail provided at one side of the free line rail in parallel thereto, and carriers suspended from the free line rails and each thereby supported at its opposite sides.

2 Claims, 8 Drawing Figures

POWER-AND-FREE TROLLEY CONVEYOR

BACKGROUND OF THE INVENTION

The present invention relates to a power-and-free trolley conveyor useful, for example, for providing a coating line in automobile manufacturing plants.

Conventional power-and-free trolley conveyors comprise a power line rail and a free line rail positioned immediately below the power line rail and supporting carriers in suspension each at the midportion of its width. Accordingly the power line rail, free line rail and other parts are positioned immediately above the article placed on the carrier, with the resulting likelihood that oil, dust, etc. will fall onto the article (such as a washed or coated motor vehicle body).

SUMMARY OF THE INVENTION

The main object of the present invention is to provide a power-and-free trolley conveyor which is free of the likelihood that oil, dust and other extraneous matter will fall onto the articles placed on its carriers.

This object can be fulfilled by a power-and-free trolley conveyor comprising a power line rail, a free line rail disposed immediately below the power line rail, another free line rail provided at one side of the free line rail in parallel thereto, and carriers suspended from the free line rails and each thereby supported at its opposite sides.

DESCRIPTION OF THE PREFERRED EMBODIMENTS

Figure 1:
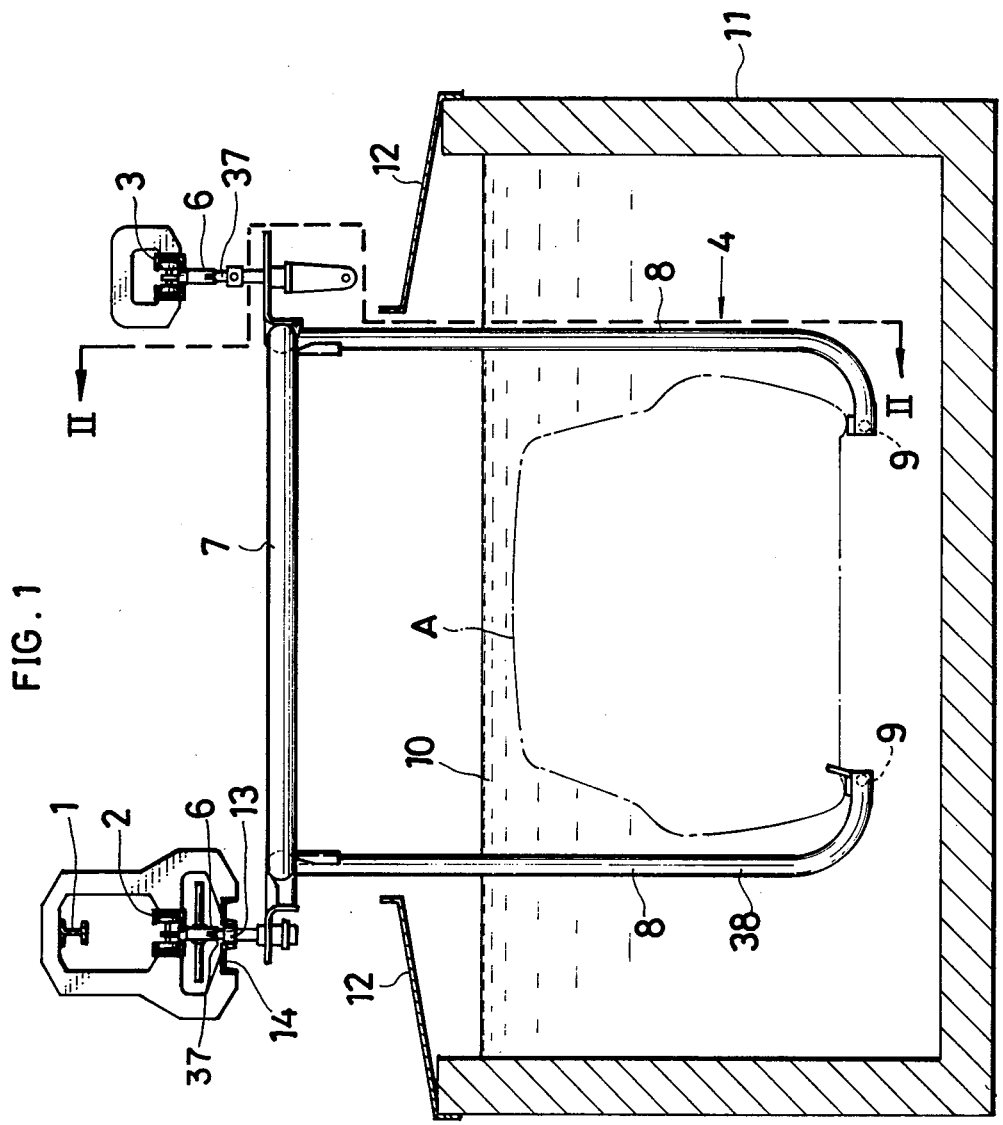
FIG. 1 is a view in vertical section showing an embodiment of the invention as it is seen from behind toward the direction of travel of its carriers.
Figure 2:
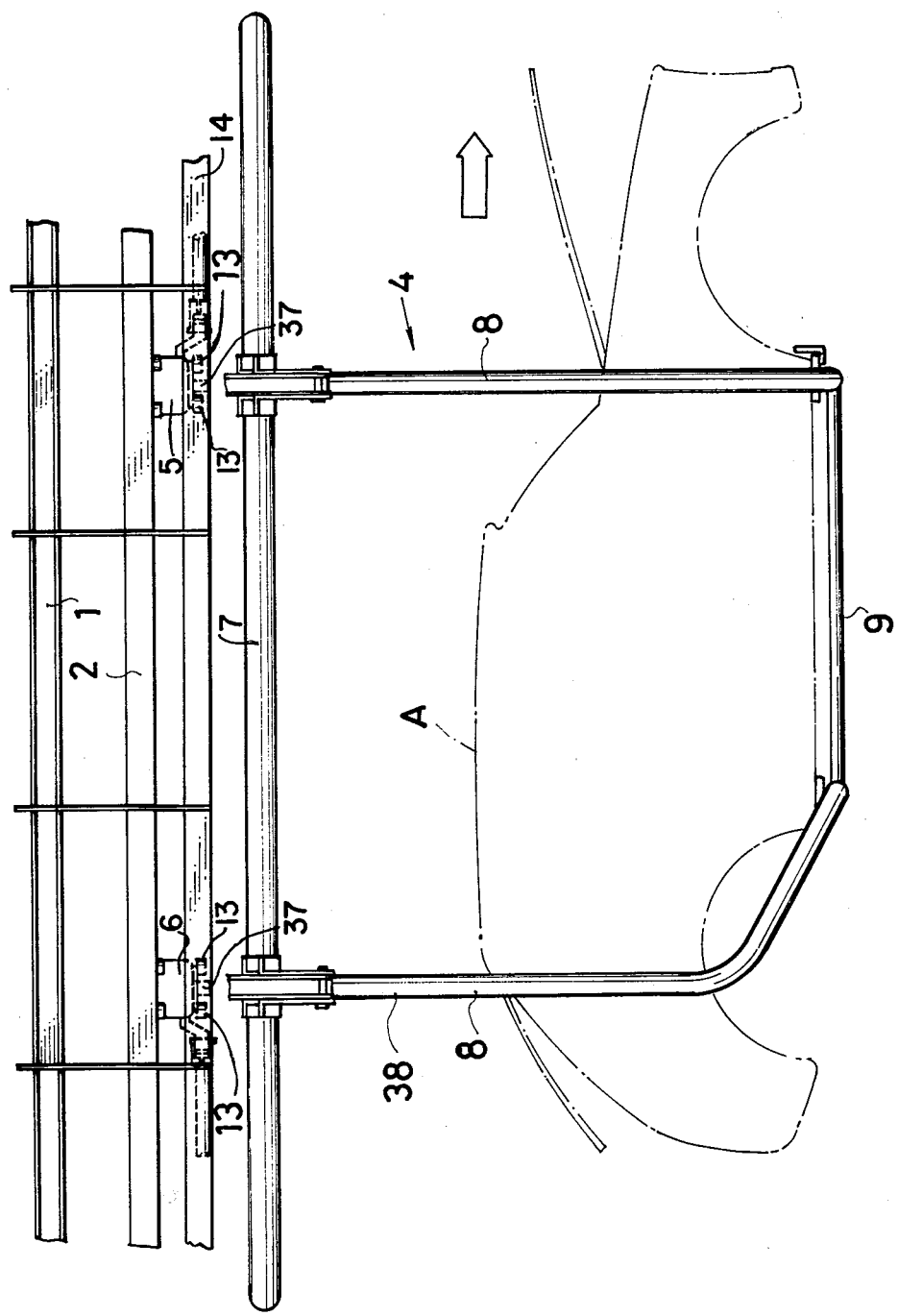
FIG. 2 is cross-section of FIG. 1 taken at lines II—II.
Figure 3:
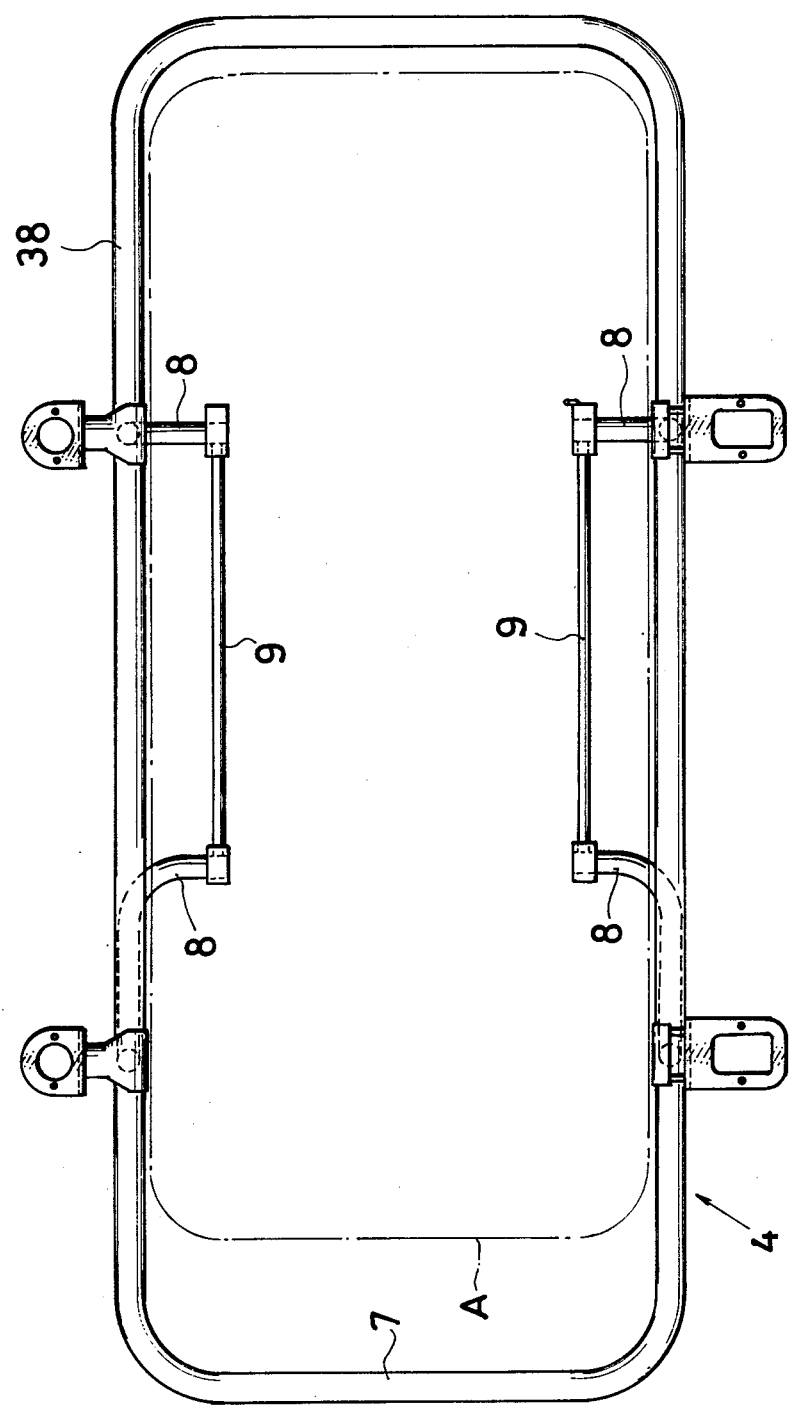
FIG. 3 is a plan view of the hanger shown in use in FIG. 1.

With reference to FIGS. 1 to 3, a power-and-free trolley conveyor includes a power line rail 1, a free line rail 2 disposed immediately below the rail 1, and another free line rail 3 provided at one side of the free line rail 2 in parallel thereto and substantially the same lateral plane. Carriers 4 are suspended from these free line rails 2, 3 and each thereby supported at its opposite sides. Each of the carriers 4 comprises a front free trolley 5 and a rear free trolley 6 suspended from each of the opposed free line rails 2, 3, and a hanger 38 suspended at each of its opposite sides from these free trolleys 5, 6 by connecting members 37. The hanger 38 comprises a horizontal frame 7 suspended from the connecting members 37 at each of its opposite sides, four arms 8 extending vertically downward and fixed to front and rear portions of the frame 7 at the opposite sides thereof, and a connecting rod 9 interconnecting each pair of front and rear arms 8 at the lower arm ends. The connecting member 37 is turnable about a sidewise substantially horizontal axis relative to the trolley 5 or 6 attached to the member 37 and is also turnable relative to the frame 7 about a substantially horizontal axis extending longitudinally of the frame or hanger. The lower ends of the arms 8 are slightly bent inwardly sidewise for supporting an article (motor vehicle body) A on the bent ends. The frame 7 is rectangular when seen in a plan view, surrounding the space above the article A, so that no portion of the frame 7 is positioned directly vertically above the article A, that is, any thing dripping or dropping down from the frame 7 will not hit the article A.

The conveyor provides a coating line which has a tank 11 containing a washing liquid 10. The tank 11 has covers 12 extending from its opposite side walls to below the opposed free line rails 2, 3. Above the tank 11 immediately below the free line rail 2 under the power line rail 1, guide rails 14 are arranged on the opposite sides of guide rollers 13 on the free trolleys 5, 6 for preventing the carrier 4 from laterally swinging.

The power-and-free trolley conveyor described above in no way permits oil, dust, etc. to fall onto the article A since none of the power line rail 1, free line rails 2, 3 and other parts are present directly above the article A. Further since the lower ends of the arms 8 on one side are not connected to, but are separate from, those on the other side, the article A can be removed from the carrier 4 easily by raising the article A as by a lift and then moving the carrier 4 longitudinally thereof.

Figure 4:
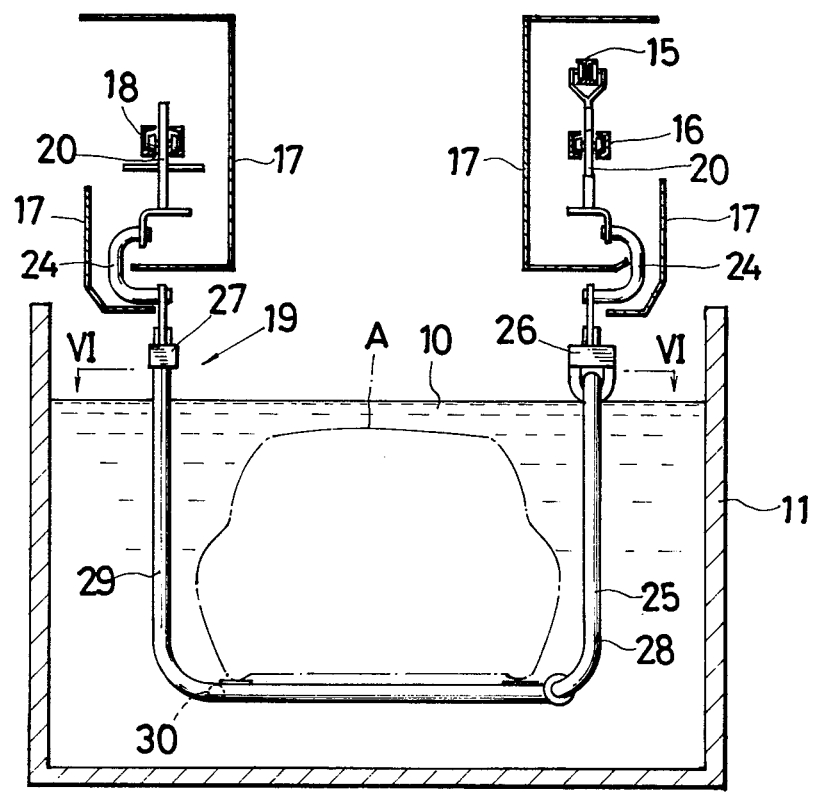
FIG. 4 is a view in vertical section showing another embodiment of the invention as it is seen from the front in a direction opposite to that of travel of its carriers.
Figure 5:
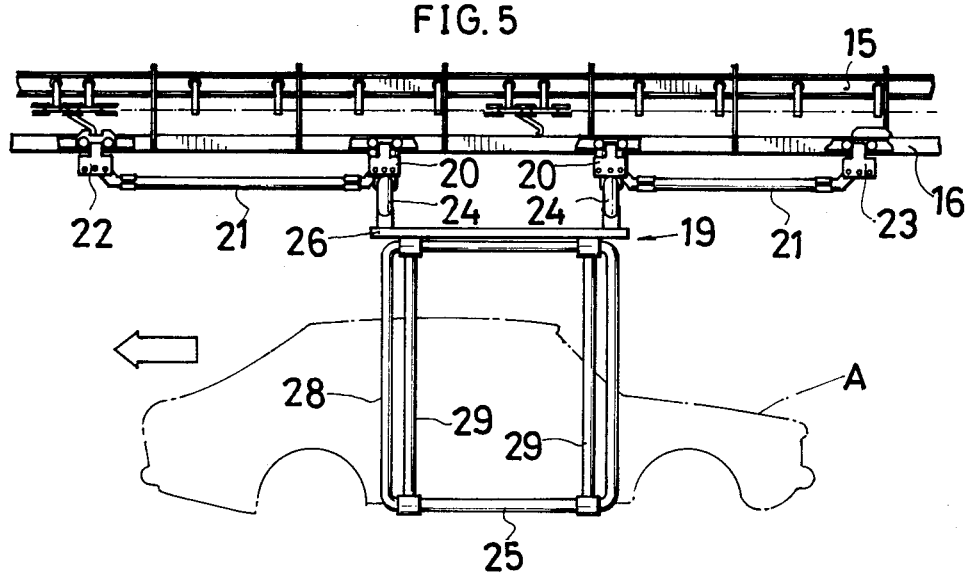
FIG. 5 is a right side elevation of FIG. 4 without the covers 17.
Figure 6:
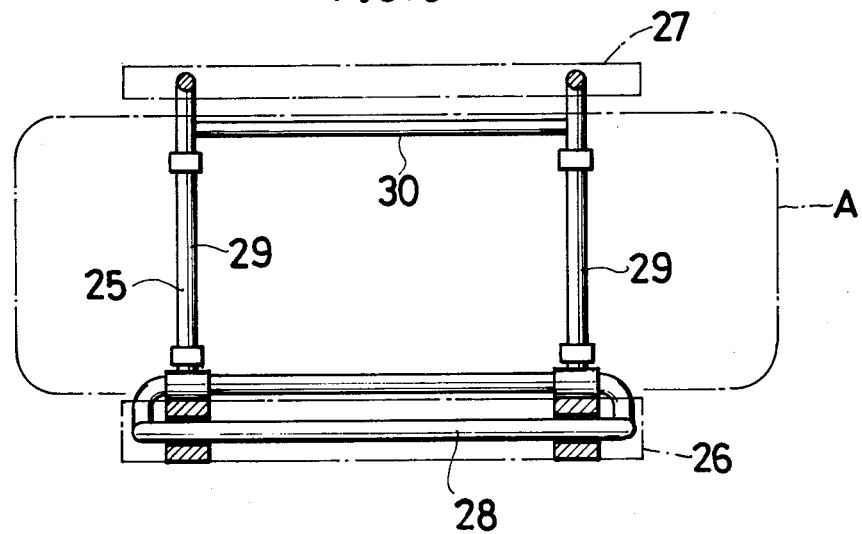
FIG. 6 is a view in section taken along the line VI—VI in FIG. 4.

FIGS. 4 to 6 show another embodiment including a power line rail 15 and a free line rail 16 immediately therebelow. These rails 15, 16 are provided with a cover 17 therearound. A similar cover 17 is also provided around another free line rail 18 which is disposed parallel to the free line rail 16. A carrier 19 comprises two intermediate free trolleys 20 suspended from each of the opposed free line rails 16, 18, front and rear free trolleys 22, 23 connected to the intermediate free trolleys 20 by connecting bars 21, and a hanger 25 suspended at each of its opposite sides from the intermediate free trolleys 20 by connecting members 24. The hanger 25 comprises a pair of opposite side horizontal members 26, 27 each suspended, at front and rear portions thereof, from the connecting members 24 so as to be pivotally movable about a sidewise substantially horizontal axis, a vertical frame 28 rectangular when seen sidewise and attached at its upper portion to the horizontal member 26 of the pair so as to be pivotally movable about a substantially horizontal axis extending longitudinally of the hanger, a pair of L-shaped front and rear arms 29 fixed, each at its one end, to front and rear portions of the other horizontal member 27 and connected, at the other ends thereof, to lower portions of the frame 28 so as to be pivotally movable about a substantially horizontal axis extending longitudinally of the hanger, and a connecting rod 30 interconnecting lower portions of the arms 29. Throughout FIGS. 1 to 6, other like parts are referred to by like reference numerals, since the second embodiment is similar to the first with the exception of the above feature.

Figure 7:
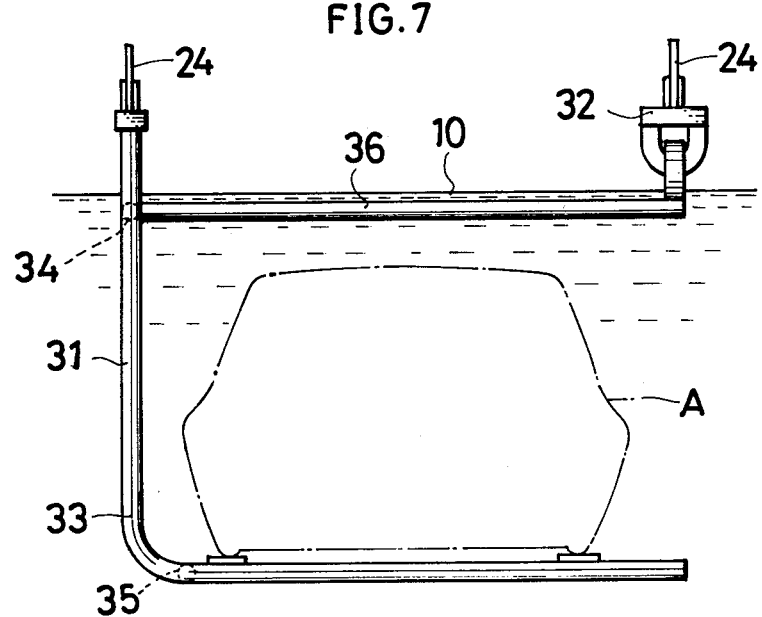
FIG. 7 is a front view showing a hanger included in another embodiment of the invention.
Figure 8:
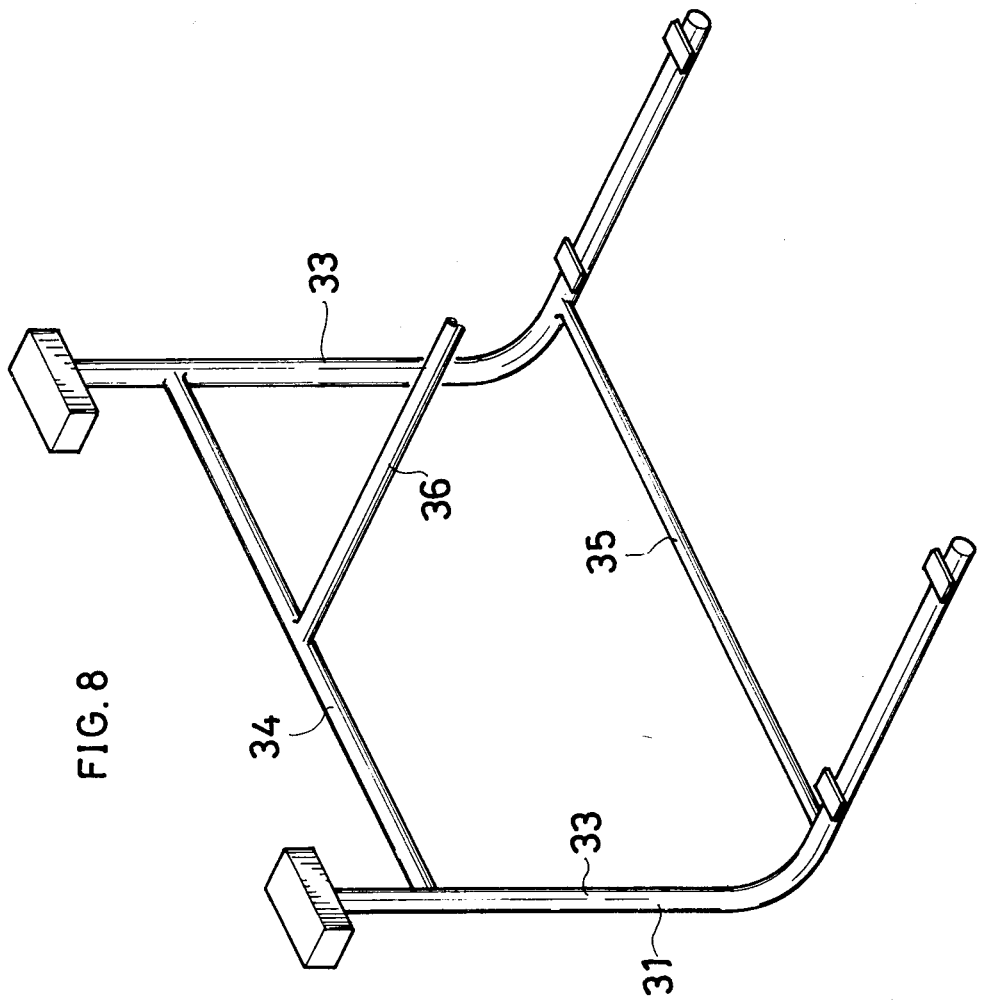
FIG. 8 is a partial perspective view showing the hanger used in the embodiment of FIG. 7.

FIGS. 7 and 8 show still another different embodiment wherein the carrier comprises a hanger 31 which is suspended at its opposite sides from free trolleys by connecting members 24 as is the case with the embodiment of FIGS. 4 to 6. The hanger 31 comprises a horizontal member 32 having front and rear portions suspended from the connecting members 24 at one of the opposite sides so as to be pivotally movable about a sidewise substantially horizontal axis, a pair of L-shaped front and rear arms 33 individually suspended from the connecting members 24 at the other side so as to be pivotally movable about the horizontal axis, upper and lower connecting rods 34, 35 interconnecting the front and rear arms 33, and a sidewise horizontal rod 36 having one end fixed to the lengthwise midportion of the upper connecting rod 34 and the other end connected to the lengthwise midportion of the horizontal member 32 so as to be pivotally movable about a sidewise substantially horizontal axis. The horizontal rod 36 is adapted to be immersed in a washing liquid 10 when the hanger 31 is passed therethrough. With the exception of the above feature, this embodiment is similar to the embodiment shown in FIGS. 4 to 6.

In the case of this embodiment, the horizontal rod 36 only is present directly above the article A placed on the arms 33, but since the horizontal rod 36 is adapted to be immersed in the liquid 10 when the hanger is passed through the liquid 10 as described above, oil, dust and the like will not adhere to the rod 36. It is therefore unlikely that such extraneous matter will fall onto the article A. Further because the forward ends of the front and rear arms 33 are not connected to each other or to the horizontal rod 36 but are free ends, the article A can be removed from the carrier easily by raising the article A as by a lift and then moving the article sidewise.

What is claimed is:

1. A power-and-free trolley conveyor comprising:
a power line rail,
a first free line rail disposed immediately below said power line rail,
a second free line rail provided at one side of said first free line rail in parallel thereto and substantially in the same lateral plane,
a first front trolley and a first rear free trolley each suspended form the first free line rail,
a second front free trolley and a second rear free trolley each suspended from the second free line rail, and
a hanger suspended from the four free trolleys, the hanger comprisng
an integrally formed rectangular horizontal frame having one side suspended from the first front and rear free trolleys and the opposite side suspended from the second front and rear free trolleys,
two front arms downwardly fixed to the front opposite sides of the horizontal frame, respectively,
two rear arms downwardly fixed to the rear opposite sides of the horizontal frame, respectively,
a connecting rod connecting one front arm and one rear arm on one side together at lower portions thereof, and
another connecting rod connecting the other front arm and the other rear arm on the other side together at lower portions thereof, each of the four arms having a lower end portion slightly bent sidewise inwardly.

2. A power-and-free trolley conveyor comprising:
a power line rail,
a first free line rail disposed immediately below said power line rail,
a second free line rail provided at one side of said first free line rail in parallel thereto and substantially in the same lateral plane, and
carrier means suspended from said first and second free line rails comprising a first front free trolley and a first rear free trolley on said first free line rail, a second front free trolley and a second rear free trolley on said second free line rail,
connecting members on each of the free trolleys turnable about a sidewise substantially horizontal axis and a longitudinal substantially horizontal axis relative to its respective free trolley, and a hanger suspended at each of its opposite sides to said connecting members, said hanger comprising
a first horizontal member having a front portion pivotally connected to the connecting member on the first front free trolley and a rear portion pivotally connected to the connecting member on the first rear free trolley,
a second horizontal member having a front portion pivotally connected to the connecting member of the second front free trolley and a rear portion pivotally connected to the connecting member on the second rear free trolley,
a rectangular frame having one side thereof laterally swingably mounted on said frist horizontal member so as to hang vertically downwardly therefrom,
a front L-shaped arm having an upper end fixed to said front portion of said second horizontal member, a lateral portion arranged perpendicular to a plane defined by said rectangular frame, and a lateral end pivotally connected to said rectangular frame on a side of said frame opposite said one side,
a rear L-shaped arm having an upper end fixed to said rear portion of said second horizontal member, a lateral portion extending parallel to said lateral portion of said first L-shaped arm, and a lateral end pivotally connected to said opposite side of said rectangular frame, and
a connecting rod fixedly interconnecting lower portions of said front and rear L-shaped arms.

* * * * *